United States Patent Office 3,436,204
Patented Apr. 1, 1969

3,436,204
MANGANESE TRACE METAL SUPPLEMENT STABILIZED WITH HEXAMETAPHOSPHATE
Elwood V. White, Bellingham, Wash., assignor to Georgia-Pacific Corporation, Portland, Oreg., a corporation of Georgia
No Drawing. Continuation-in-part of application Ser. No. 310,459, Sept. 20, 1963. This application Sept. 15, 1966, Ser. No. 579,519
Int. Cl. C05; A01n 7/00; C01b 25/30
U.S. Cl. 71—1          20 Claims This application is a continuation-in-part of Ser. No. 310,459 filed Sept. 20, 1963, now abandoned.

This invention pertains to a plant nutrient supplement. More particularly, it pertains to an improved trace metal plant supplement composition and process for its preparation and use.

An important function of metal ions in plant and animal life is that many of the metals serve as catalysts for the various processes which take place within the plant and animal. Approximately 38 elements are necessary for biological systems of which 15 are elements such as carbon, oxygen, sodium, phosphorous, calcium, nitrogen, and the like which are present in major amounts; the remainder are present in trace amounts. While the requirement of trace elements differs for different plants, substantially all plants require elements such as iron, manganese, and zinc in small amounts.

Most of the plants obtain the metals they require from the soil or medium in which they grow. While some soils may be deficient in certain trace metals necessary for plant growth, other soils may contain the metals but in a form which is unavailable to the plant. For example, trace elements may be present in insoluble salts. These salts decompose slowly by weathering to make the element available to most plants at a rate insufficient for their normal requirements. Since there are many soils which may be deficient in trace elements or have these metals present in a form which is unavailable to the plant, various plant stimulants or supplements are used to treat the soil or plant to supply the required elements. The trace elements are usually supplied to the plant or soil in a chelated or complex state. The complexes or salts of materials such as sulfonated lignin and sulfonated tannins are commonly used. In the presence of certain nutrients found in the plant growing medium or in the presence of fertilizers, some of these materials for example, manganese salts may precipitate with the result that manganese becomes unavailable to the plant. While the conditions necessary for precipitation of manganese compounds may occur in the plant growing medium, such conditions are more commonly encountered when trace elements are intermixed with fertilizers for application to the soil.

In application of the trace elements, it is often desirable to intermix the trace elements with other plant nutrients or fertilizers so that a repeated number of applications would not be necessary to supply the required nutrients to the plants. When this is done, the ingredients are generally intermixed in relatively concentrated form and in a much greater concentration than that which would be normally encountered in the soil. As a result, a substantial portion of the manganese salt may be rendered ineffective by the formation of an insoluble complex. This problem may also be encountered even though the particular constituents or fertilizers and the trace elements are applied separately but within a relatively short space of time before the nutrient first applied has had an opportunity to become dispersed throughout the soil or plant growing medium. For example, in an application of the fertilizer to a field followed by an immediate application of the trace elements, the formation of insoluble complexes may occur due to localized high concentration of the nutrients prior to the distribution of the elements within the soil.

It is therefore an object of this invention to provide a stabilized trace metal plant supplement composition. A further object is to provide a stabilized trace metal supplement which will be readily available to the plants. A still further object is to provide a trace metal supplement which may be intermixed with other plant nutrients without precipitation of the trace metal. A still further object is to provide a process for the treatment of the soil and the plant with a trace metal supplement composition wherein the trace metal supplement will remain available to the plant.

The above and other objects are attained according to this invention by employing a trace metal supplement composition which comprises a manganese salt of sulfonated lignins or sulfonated tannins with which is intermixed a water-soluble hexametaphosphate in an effective amount sufficient to stabilize the manganese from precipitation. While it is expected that the manganese is in some manner complexed with the above sulfonated materials, the addition of the hexametaphosphate stabilizes the composition and prevents the manganese from precipitating when applied to the soil or plants, or intermixed with other constituents.

The manganese salt of sulfonated lignin is commonly used as a plant trace metal supplement. While the sulfonated lignin used may come from any lignin source, one of the main sources of lignosulfonate or sulfonated lignin is the paper and pulp industry where lignocellulosic materials such as wood, straw, corn stalks, bagasse, and the like are processed to separate the cellulose or pulp from the lignin. Lignin is a polymeric substance of substituted aromatics found in plant tissue associated with cellulose and hemicelluloses. Thus, in recovering the pulp the lignin is obtained as a water-soluble by-product. There are a number of processes employed for the separation of the lignin from the cellulose materials found in the plant matter. In the sulfite process, the lignocellulosic material is digested with a bisulfite or sulfite wherein the lignin is sulfonated and dissolved to form the spent sulfite liquor. In other pulping processes, the lignin may be obtained in other forms. However, the product may be readily sulfonated by the various known methods of sulfonation. For example, the lignin product obtained in an alkaline process of digestion of lignocellulosic material may be sulfonated by reacting the product with a sulfite or bisulfite in a manner similar to that employed in the sulfite pulping process. Since the lignin is obtained in the sulfonated form by the bisulfite or sulfite process, spent sulfite liquor is convenient for use in the preparation of plant supplements without further sulfonation.

In a manner similar to that employed in the sulfonation of wood for pulp, tannin as found in tree bark or tannin extracts such as quebracho, wattle, myrobalan, and others may be sulfonated to obtain a water-soluble sulfonated product. These sulfonated products likewise have complexing or chelating properties which make them useful as a source for preparation of plant supplements.

The manganese trace metal supplement is usually obtained by reacting the sulfonated product with a water-soluble manganese salt. By intermixing the water-soluble manganese compound with the sulfonated material, an interaction is obtained forming the desired product. The sulfonated materials may be salts containing cations such as magnesium, calcium, ammonium, sodium, or others depending on the process used for sulfonation. For example, if the sulfonation is effected with the sodium sulfite, the sulfonated lignin or sulfonated tannin will be in a form of a sodium salt. These salts may be used as such for the formation of the manganese salt or complex, or they may be converted to the sulfonic acid by addition of an acid or by the use of a cation exchange resin and the manganese salt prepared therefrom. Also, the lignosulfonate product obtained from the sulfite pulping industry or by sulfonation of tannin extracts or tree bark contains many constituents other than sulfonated lignins or tannins. These constituents do not adversely effect the trace metal supplement. However, it may be desirable to process the lignin or tannin-containing materials prior to or after sulfonation to recover some of the particular constituents the materials may contain to be used for other purposes.

The interaction of a water-soluble manganese compound with the sulfonated material may be effected by intermixing the compounds in an aqueous medium. The interaction may be carried out at room temperature. However, it is desirable generally to heat the reaction mixture to a temperature in the range of 50° C. to 200° C. and maintain that temperature for a period of time of from five to ten minutes, or up to as long as 24 hours or longer. Usually the mixture is heated at 70° C. to 100° C. for from one-half to two hours. After the heating period, the product may be evaporated further to obtain a solution of a desired concentration or the product may be dried. Generally, spray drying will give a powder-like material which is convenient to handle and intermix with other ingredients in a dry state. Usually the interaction is effected at a pH below 6, preferably at a pH below 4.

The exact reaction or method by which the manganese becomes associated with the above-sulfonated material is not definitely known. Simple salts may be formed; however, it is believed that the manganese interacts with the acidic groups, particularly the sulfonic acids groups, to form a different bonding than ordinarily is found in simple salts. After formation of the products, it is possible to remove some of the metals from the product by cation exchange resins indicating the presence of free metal ions in the solution. However, some portion of the manganese ions do not readily exchange and all of the ions surprisingly resist precipitation when sodium hydroxide is added to aqueous solutions of the mixture. This behavior is indicative of an association different from a simple salt. Thus, the term "manganese salt" as used herein with respect to the sulfonated lignin and sulfonated tannins means the interaction product of the sulfonated material with a soluble manganese compound whatever the method of association effected between the manganese and the sulfonated material.

While the manganese salts of the sulfonated products are stable under most conditions, the manganese salt may precipitate in the presence of other plant nutrients or other constituents normally found in a plant or a plant growing medium such as phosphates and the like. This is especially true in the pH range of 5 to about 9 which is commonly encountered in soils, plant growing medium, or within the plant system. Concentration of the trace metal which may be present without appreciable precipitation will depend upon the other constituents present. For example, in a solution containing substantially only a soluble phosphate and the manganese salt, the concentration of manganese salt may be as high as 0.5% before appreciable precipitation is obtained; however, in solutions containing other plant nutrients, or other constituents as may be normally encountered, including other trace metal salts such as iron and zinc, the concentration of the manganese salt may not rise above 0.01 weight percent without appreciable precipitation of manganese. In the application of trace metals, the compositions are used in concentartions at which precipitation is encountered. Thus, to obtain full advantage from the supplement, the manganese salt must be stabilized to prevent precipitation by use of a water-soluble hexametaphosphate. The exact mechanism by which the hexametaphosphate effects stabilization is not known although it is believed that the hexametaphosphate complexes further with the manganese lignosulfonate salt. However, the presence of the hexametaphosphate ion will give the desired result.

Any water-soluble salt or compound which ionizes in an aqueous medium to supply the hexametaphosphate ion may be used. Hexametaphosphate salts, such as ammonium, sodium, and potassium hexametaphosphate and hexametaphosphoric acid are most often employed. Thus the term "hexametaphosphate" as used herein means the acid, the water-soluble hexametaphosphate salts, and other compounds which dissociate in an aqueous medium to supply the hexametaphosphate ions.

Only a small amount of hexametaphosphate may be needed to stabilize the manganese salt. The minimum ratio of hexametaphosphate to manganese increases progressively with the amount of manganese salt present in the soil or plant-growing medium. As little as 0.01 mole of hexametaphosphate per mole equivalent of manganese may be satisfactory for solutions or plant growing mediums containing low concentrations of manganese. As the concentration of manganese salt is increased, the minimum amount of hexametaphosphate required for stabilization may be as high as 1.5 moles of hexametaphosphate per mole equivalent of manganese. Generally, from 0.1 to 0.5 mole of hexametaphosphate per mole equivalent of manganese is employed. The above amount will stabilize the manganese salt under most conditions.

To effect the stabilization, it is generally most convenient to intermix the water-soluble polyphosphate with the manganese salt prior to use. The composition can then be sold in either liquid or solid form containing the hexametaphosphate and the manganese salt for application to plants and soils by spraying or by addition to fertilizers or other plant nutrient mixtures. It is also possible to effect stabilization of the manganese salt by applying the polyphosphate and the manganese salt separately. For example, the water-soluble hexametaphosphate may be added to the soil or growing medium or sprayed upon the plant prior to or at substantially the same time that the iron trace metal salt is applied. While the hexametaphosphate may be sprayed on after the application of the trace elements, the treatment is not as effective as when applied prior to or at substantially the same time. However, it is generally more convenient to intermix the water-soluble hexametaphosphate with the manganese salt prior to application.

The manganese salt, intermixed with the polyphosphate may be used as an individual additive or may be combined with other trace metals. In the preparation of trace metal additives, it is convenient to provide a composition which will contain more than one trace element. For example, in preparing a trace metal supplement of sulfonated lignin, the sulfonated lignin may be reacted with water-soluble salts of iron, manganese, zinc, and others so that a composition is obtained which will contain lignosulfonate salts of the desired trace metals. The ratio of these metals may be adjusted as desired so that the supplement will contain the ratio of trace elements normally required for plant growth. This supplement can then be added to a fertilizer or applied to the soil or plant directly. The multiple trace metal composition simplifies the application in that the formulation can be made at the time of manufacture eliminating the necessity of mixing the composition in the field or applying the individual trace metals separately.

When a multiple trace element composition is used, many of the trace elements are stable under normal conditions but certain of the trace metals, like manganese, may precipitate or in some other manner become unavailable to the plant. The addition of the polyphosphate to the multiple trace metal composition will not stabilize the composition with respect to all metals under all conditions and other stabilizers must be added. For example, for a composition containing the zinc salt of the sulfonated products, a water-soluble mercaptoacetate or mercaptoacetic acid must be used to effectively stabilize the zinc salt. Likewise, for an iron trace metal salt, a water-soluble citrate is used. The hexametaphosphate used to stabilize the manganese salt is compatible with these other additives. Thus, when a trace metal composition is used which contains other trace metals, as, for example, zinc and iron in addition to the manganese, the stabilizing agents added to this composition may include, in addition to the water-soluble hexametaphosphate, the water-soluble mercaptoacetate compound to stabilize the zinc, and a citrate to stabilize the iron. The water-soluble citrate and mercaptoacetate are added in amounts of from about 0.1 to 1.0 mole per mole equivalent of iron and zinc, respectively.

The following examples further illustrate the invention.

Example I

To show the stabilization obtained by addition of a hexametaphosphate to a managanese salt, a series of runs was made where solutions of various concentrations of a manganese linosulfonate salt were stabilized against precipitation in the presence of phosphate ions.

The manganese lignosulfate salt used was prepared from a calcium base spent sulfite liquor obtained from a calcium bisulfiate pulping process. The spent sulfite liquor was fermented to remove the fermentable sugars by converting them to alcohol and recovering the alcohol by distillation of the fermented mixture. The residue thus obtained was reacted with a manganese sulfate to obtain a composition which contained about 1.4 weight percent of manganese with respect to the solids contained in the product.

In the runs made, solutions containing 0.5, 2.0 and 4 weight percent of the manganese lignosulfonate salt were used. A predetermined amount of sodium hexametaphosphate was added to the manganese salt solution, and then the polyphosphate containing solution was intermixed at pH 7 with a phosphate solution. The resulting mixture was observed to see whether the mixture remained clear, became cloudy, or whether sufficient precipitation was obtained for the precipitate to settle out. The phosphate solution was added in an amount to obtain in the final mixture 0.5 percent by weight of phosphate as $PO_4\equiv$. The results obtained are shown in the table below.

| Concentration of manganese salt, weight percent | Moles sodium hexametaphosphate per mole of manganese | Appearance of mixture after addition |
|---|---|---|
| 0.5 | 0 | Precipitate formed immediately. |
|  | .05 | Precipitate obtained upon setting overnight. |
|  | .1 | Clear. |
| 2.0 | 0 | Precipitate. |
|  | .13 | Precipitate obtained upon setting overnight. |
|  | .26 | Clear. |
| 4.0 | 0 | Precipitate formed immediately. |
|  | 0.3 | Precipitate formed upon setting overnight. |
|  | 0.6 | Clear. |

The runs described above were repeated wherein the phosphate concentration in the final mixture was increased to about one percent by weight. Similar results as given above were obtained.

Example II

In a manner similar to that described in Example I, a series of runs was made where a multi-trace metal plant supplement similar to that sold under the trademark of Multi-Tracin by Georgia-Pacific Corporation was used. The multi-element material was prepared from fermented spent sulfite liquor and contained 4.7 percent of iron, 0.45 percent of copper, 1.4 percent of manganese, 1.6 percent of zinc, 1.2 percent of boron, and 0.07 percent of molybdenum.

The solutions used for testing contained about one percent by weight of the multi-metal composition dissolved in water. The addition of phosphate ion to the solutions produced a precipitate over a pH range between 5 and 9. Some precipitation also took place upon addition to phosphate if the test solution was adjusted to contain citric acid in an amount of 0.66 mole per mole of iron present or thioglycolic acid in an amount of 0.1 mole per mole of zinc present. However, when the test solution was adjusted to contain citric and thiogycolic acid in the above stated amount as well as hexametaphosphate in an amount of 1.3 moles per mole of manganese present in the solution, no precipitation formed upon addition of phosphate ion.

Example III

A manganese salt of sulfonated bark extract containing about 4.7 weight percent of manganese was prepared. To a 4 weight percent solution of this salt, sodium phosphate was added in an amount to obtain about 1.5 weight percent of the phosphate in solution. An immediate precipitate was obtained upon the adjustment of the pH solution to 7. However, when sodium hexametaphosphate was added in a mole ratio of about .1 mole per mole of manganese to a similar solution containing the phosphate, only a slight precipitate was obtained after standing overnight.

What is claimed is:

1. A trace metal supplement composition which comprises a manganese salt of a member selected from the group consisting of sulfonated lignins and sulfonated tannins, plus a water-soluble hexmetaphosphate in an amount sufficient to stabilize the manganese from precipitation.

2. A composition according to claim 1 wherein the manganese salt is manganese salt of a sulfonated tannin.

3. A composition according to claim 1 wherein manganese salt is a manganese salt of a sulfonated lignin.

4. A composition according to claim 3 wherein the sulfonated lignin is spent sulfite liquor.

5. A composition according to claim 4 wherein the water-soluble hexametaphosphate is present in an amount of from .01 to 1.5 moles of the hexmetaphosphate per mole equivalent of manganese in the salt.

6. A composition according to claim 5 wherein the hexametaphosphate is sodium hexametaphosphate present in an amount of from 0.1 to 0.5 mole equivalent of manganese in the salt.

7. A fertilizer composition which comprises plant nutrients containing phosphate compounds, a manganese salt of a member of a group consisting of sulfonated lignin and sulfonated tannins, and a water-soluble hexametaphosphate in an effective amount sufficient to stabilize the manganese from precipitation in the presence of water.

8. A composition according to claim 7 wherein the manganese salt is a manganese salt of a sulfonated tannin.

9. A composition according to claim 7 wherein the manganese salt is a manganese salt of a sulfonated lignin.

10. A composition according to claim 9 wherein the sulfonated lignin is a spent sulfite liquor and the hexametaphosphate is sodium hexametaphosphate present in an amount of from 0.1 to 0.5 mole of sodium hexametaphosphate per mole equivalent of the manganese in the salt.

11. In a process for the preparation of a liquid plant fertilizer, wherein the plant nutrients containing a manganese salt of sulfonated lignin and a phosphate salt are dissolved in an aqueous medium, the improvement which comprises adding a water-soluble hexmetaphosphate to the aqueous medium at a time not substantially later than the time the manganese salt is added in an amount sufficient to stabilize the manganese from precipitation.

12. A process according to claim 11 wherein the water-soluble hexametaphosphate is intermixed with the manganese salt prior to addition to the aqueous medium.

13. A process according to claim 12 wherein the water-soluble hexametaphosphate is sodium hexametaphosphate and is intermixed in an amount of from 0.1 to 0.5 mole of hexametaphosphate per mole equivalent of the manganese present in the manganese salt.

14. In a process of treating a soil to supply trace metals thereto, where in a manganese salt of a member of the group consisting of sulfonated lignins and sulfonated tannins is added to the soil, the improvement which comprises adding a water-soluble hexametaphosphate to the soil at substantially the same time the manganese salt is added to the soil in an amount sufficient to thereby stabilize the manganese in the salt from precipitation.

15. A process according to claim 14 wherein the water-soluble hexametaphosphate is intermixed with the manganese salt prior to addition to the soil.

16. A process according to claim 15 wherein the manganese salt is a manganese salt of sulfonated tannins.

17. A process according to claim 15 wherein the manganese salt is a manganese salt of sulfonated lignin.

18. A process according to claim 17 wherein the sulfonated lignin is a spent sulfite liquor.

19. A process according to claim 18 wherein sodium hexametaphosphate is supplied as a water-soluble hexametaphosphate in an amount of from 0.01 to 1.5 moles of hexametaphosphate per mole equivalent of the manganese.

20. A process according to claim 19 wherein the sodium hexametaphosphate is supplied in an amount of from 0.1 to 0.5 mole of hexametaphosphate per mole equivalent of the manganese.

References Cited

UNITED STATES PATENTS

| | | | |
|---|---|---|---|
| 2,683,658 | 7/1954 | Saunders | 71—1 |
| 2,744,866 | 5/1956 | Kahler | 71—1 |
| 2,770,538 | 11/1958 | Vierling | 71—2.5 |
| 2,860,448 | 11/1958 | Carasso | 47—58 |
| 2,929,700 | 3/1960 | Bennett | 71—1 |

DONALL H. SYLVESTER, *Primary Examiner.*

R. D. BAJEFSKY, *Assistant Examiner.*

U.S. Cl. X.R.

71—33; 23—106